United States Patent [19]

Isoda et al.

[11] Patent Number: 5,976,477
[45] Date of Patent: Nov. 2, 1999

[54] REACTION CONTROL METHOD USING CARBON SOOT MOLECULES AND ORGANOMETALLIC COMPLEXES IN EXCITED STATE

[75] Inventors: Satoru Isoda; Toshiyuki Kamiya; Yoshio Hanazato; Akira Ikeda, all of Amagasaki, Japan

[73] Assignee: Mitsubishi Denki Kabushiki Kaisha, Tokyo, Japan

[21] Appl. No.: 08/928,417

[22] Filed: Sep. 12, 1997

Related U.S. Application Data

[63] Continuation of application No. 08/561,623, Nov. 21, 1995, abandoned, which is a continuation of application No. 08/141,087, Oct. 26, 1993, abandoned.

[30] Foreign Application Priority Data

Apr. 23, 1993 [JP] Japan .................................. 5-097886

[51] Int. Cl.$^6$ .............................. A62D 3/00; B01D 53/56
[52] U.S. Cl. ................... 423/239.1; 588/222; 204/157.3; 204/157.5; 210/748; 210/757
[58] Field of Search .................................. 588/205, 223, 588/224, 225, 221, 222; 423/DIG. 39, 210, 579, 235, 239.1; 204/157.3, 157.5, 158.21; 210/748, 757

[56] References Cited

U.S. PATENT DOCUMENTS

| | | | |
|---|---|---|---|
| 3,431,074 | 3/1969 | Jordan | 423/461 |
| 3,951,797 | 4/1976 | Seely | 210/748 |
| 3,974,040 | 8/1976 | Siebke et al. | 204/410 |
| 4,008,136 | 2/1977 | Williams | 210/748 |
| 4,315,998 | 2/1982 | Neckers et al. | 525/332 |
| 4,520,072 | 5/1985 | Yoshino et al. | 210/698 |
| 4,568,435 | 2/1986 | Shelnutt | 204/157.52 |
| 4,806,514 | 2/1989 | Langford et al. | 204/158.21 |
| 4,889,604 | 12/1989 | Khan et al. | 204/157.5 |
| 4,986,921 | 1/1991 | Yates et al. | 210/758 |
| 5,004,551 | 4/1991 | Sublette | 210/763 |
| 5,032,291 | 7/1991 | Sublette | 210/757 |
| 5,139,625 | 8/1992 | Tanaka et al. | 204/130 |
| 5,172,278 | 12/1992 | Tutt | 359/241 |
| 5,310,669 | 5/1994 | Richmond et al. | 435/174 |
| 5,340,716 | 8/1994 | Ullman et al. | 435/6 |
| 5,345,032 | 9/1994 | Marks | 588/207 |

FOREIGN PATENT DOCUMENTS

| | | |
|---|---|---|
| k 21085 | 1/1956 | Germany . |
| 1 467 493 | 12/1969 | Germany . |
| 15 92 856 | 4/1979 | Germany . |
| 973834 | 10/1964 | United Kingdom . |

OTHER PUBLICATIONS

M. Fastow et al., "IR Spectra of CO and NO Adsorbed on $C_{60}$", *Journal of Physical Chemistry*, vol. 96, No. 15, 1992, pp. 6126–8.

M. Terazima et al., "Photothermal Investigation of the Triplet State of $C_{60}$", *Journal of Physical Chemistry*, vol. 95, No. 23, 1991, pp. 9080–5.

M. Iwamoto et al., "Catalytic Decomposition of Nitric Oxide Over Copper(II)–Exchanged Y–Type Zeolites", *J. Chem. Soc., Faraday Trans. 1*, 1981, vol. 77, pp. 1629–1638.

Arbogast et al. "Photophysical Properties of $C_{60}$", *Journal of Physical Chemistry* 95 (1), pp. 11–12 (1991).

D.D.M. Wayner, et al. "Selective Catalytic Debromination by $C_{60}$. . . ". J. Am. Chem. Soc., vol. 115, #1, pp. 367–368, Jan. 1993.

*Primary Examiner*—Wayne Langel
*Assistant Examiner*—Peter DiMauro
*Attorney, Agent, or Firm*—Burns, Doane, Swecker & Mathis, LLP

[57] ABSTRACT

A method and an apparatus for controlling reactions of a gas and a fluid that makes use of excellent reactivity of carbon soot molecules, metal porphyrin complexes and metal phthalocyanin complexes which are in an excited state has an arrangement that the carbon soot molecules, the metal porphyrin complexes and the metal phthalocyanin complexes which are excited by a physico-chemical method, such as light irradiation, and a gas containing oxygen are brought into contact with each other to generate active oxygen. Further, the gas containing the harmful substance and a fluid are brought into contact with each other so that direct reactions of the active oxygen and the excited molecules decompose the harmful substances.

24 Claims, 5 Drawing Sheets

REACTION CONTROL METHOD USING CARBON SOOT MOLECULES AND ORGANOMETALLIC COMPLEXES IN EXCITED STATE

This application is a continuation, of application Ser. No. 08/561,623, filed Nov. 21, 1995, abandoned, which is a continuation of application Ser. No. 08/141,087, filed Oct. 26, 1993, abandoned.

BACKGROUND OF THE INVENTION

1. Field of the Invention

The present invention relates to a method and an apparatus for controlling reactions that take place between carbon soot molecules, metal porphyrin complexes, metal phthalocyanin complexes and various gases or fluids, more particularly to a method and an apparatus for preparing active oxygen, which is considered to have satisfactory ability of decomposing harmful substances, such as inorganic compounds and organic substance, by making use of a gas containing oxygen as the gas to be allowed to react.

More particularly, the present invention relates to a method and an apparatus for decomposing harmful substances in a harmful gas or a solution by causing the harmful gas or the solution containing the harmful substances to react with active oxygen obtained from carbon soot molecules, metal porphyrin complexes or metal phthalocyanin complexes or by direct contact reactions with the foregoing molecules. In particular, the present invention relates to a method and an apparatus capable of purifying contamination substances in air or water. Therefore, the present invention relates to a technology for purifying environmental contamination which raises a problem in recent years.

2. Description of the Related Art

There have been a variety of conventional technologies for decomposing harmful substances by making use of active oxygen. A technology for decomposing organic compounds by utilizing ozone generated by an ozonizer has been available.

Figure 10:
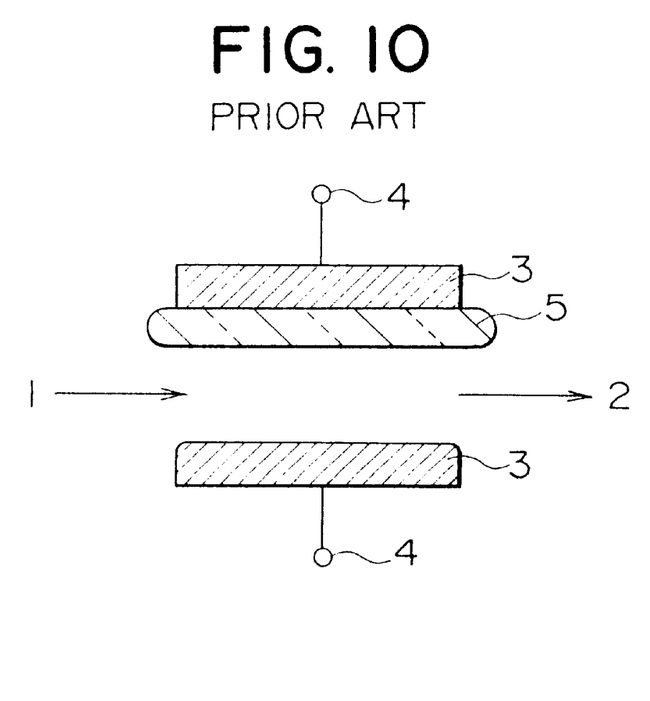
FIG. 10 is a schematic view which illustrates the structure of a voiceless discharge organizer for use in a conventional method of decomposing the harmful substances.

FIG. 10 is a schematic view which illustrates the structure of voice-less discharge ozonizer reported by Masaaki Tanaka and Norikazu Tabata in Magazine of Society of Electrostatics, Vol. 3, No. 3 (1983). Referring to FIG. 10, AC high voltage sources 4 are connected to metal electrodes 3. A glass plate 5 is disposed on either side of the metal electrode 3. Thus, ozonized gas is generated from a raw material gas 1.

An ozone generating mechanism of the ozonizer will now be described. When AC voltage of 6 to 18 kV is applied while causing a gas containing oxygen to flow between metal electrodes 3 that interpose the dielectric substance, such as glass or ceramics, voice-less discharge takes place. Electrons discharged from the electrodes collide with oxygen molecules so that excited oxygen molecules are generated. The excited oxygen molecules thus-generated react with other oxygen molecules so that ozone is generated. The ozone thus-generated is caused to react with organic substances to decompose the organic substances.

Another technology for decomposing the harmful substances by making use of direct reactions in place of using active oxygen is exemplified by sewage/waste water treatment technology typified by an activated sludge process, which is the application of the metabolic function of an organism, and a technology for decomposing the waste gas from the combustion unit, such as the engine of an automobile, by making use of a catalyst.

Investigations have been made to use metal or a metal oxide or metal ion exchanging zeolite in the technology for decomposing the waste gas using the catalyst. As reported by Masakazu Iwamoto in J.Chem.Coc., Faraday Trans. I, vol. 77 (1981), NO can be decomposed at a decomposing efficiency of about 90% if a copper ion exchanging zeolite is used as the catalyst and 4% NO is caused to react at 500° C.

Although the technology for decomposing the harmful substances using generated ozone is effective, the types of the harmful substances, which can be decomposed, are limited because of the reactivity of ozone. For example, it has been known that acetic acid cannot easily be decomposed by ozone. What is worse, the arrangement that ozone is generated by a high-voltage discharge technology encounters a problem that energy cannot be saved and the size of the apparatus cannot be reduced. Further, ozone is stable for tens of hours after it has been generated and the human body is sometimes affected adversely.

The biological treatment technology using the activated sludge has various problems that a large-scale processing facility is needed, time to complete the treatment is too long and organisms are left in the form of sludge.

The decomposition of the waste gas using the catalyst encounters a problem in that the decomposing reactions do not proceed if the temperature is lower than a predetermined level.

SUMMARY OF THE INVENTION

The present invention is directed to overcome the foregoing various problems, and therefore, an object of the present invention is to provide a method and an apparatus for easily preparing active oxygen by reactions between excited carbon soot molecules or metal porphyrin complexes or metal phthalocyanin complexes and oxygen molecules. Further, there are provided a method and an apparatus for decomposing harmful substances in such a manner that active oxygen thus-obtained is used or direct reactions of the excited carbon soot molecules or metal porphyrin complexes or metal phthalocyanin complexes are utilized.

According to one aspect of the present invention, there is provided a reaction control method comprising the step of: causing one or more kinds of compounds selected from a group consisting of carbon soot molecules, metal porphyrin complexes and metal phthalocyanin complexes which are in an excited state to react with a substance to be allowed to react.

According to another aspect of the present invention, there is provided a reaction apparatus comprising: a container having a port for introducing a substance to be allowed to react and a port for letting out (discharging) the substance to be allowed to react; one or more kinds of compounds selected from a group consisting of carbon soot molecules, metal porphyrin complexes and metal phthalocyanin complexes; and exciting means for bringing the compounds into an excited state.

DESCRIPTION OF THE PREFERRED EMBODIMENT

Carbon soot molecules according to the present invention are molecules, that is, Cn (n=18 to 300), solely composed of carbons which are generated by evaporating graphite by vacuum discharge or by irradiating the graphite with large-energy laser beams, the carbon soot molecules being fullerene molecules which are stable spherical-shell molecules having 60, 70, 76, 78, 82, 84 or 90 carbons, spherical-shell molecules and tubular molecules respectively having 100 or more carbons and spherical-shell fragment molecules having less than 60 carbons. The term "carbon soot molecules" in this specification is defined such that it includes all of the foregoing substances.

The method of controlling the reactions of the gases and the fluids according to the present invention makes use of a fact that carbon soot molecules, metal phthalocyanin complexes and metal porphyrin complexes are brought to an excited state by a physico-chemical method, such as light irradiation, injection of electrons caused by electrodes or a reducing reaction realized by an electron donor, so that the reactivity with the various gases and the fluids is enhanced considerably. The method according to the present invention enables reactions with the gases and fluids to be enhanced that has encountered a difficulty for the conventional method.

A method of preparing active oxygen according to the present invention makes use of a fact that carbon soot molecules, metal phthalocyanin complexes and metal porphyrin complexes in an excited state exhibit satisfactory reactivity with oxygen molecules. When the foregoing molecules in the excited state and oxygen molecules are brought into contact with one another, electron transfer and energy transfer take place between the oxygen molecules and the foregoing molecules. As a result, active oxygen (singlet oxygen) is generated.

The active oxygen thus-generated exhibits satisfactory reactivity with other molecules, such as inorganic compounds or organic compounds, and has an excellent ability of oxidizing and decomposing the foregoing compounds. It has been known that the decomposing reactivity of the active oxygen is significantly superior to the decomposing reactivity realized by ozone which has been used as a conventional method of decomposing harmful substances.

Since the active oxygen has excellent reactivity with inorganic compounds and organic compounds as described above, the active oxygen can be used in a method of decomposing harmful substances which makes use of the reactions with harmful substances and which exhibits superior decomposing ability to the conventional method.

The carbon soot molecules, metal phthalocyanin complexes and metal porphyrin complexes in the excited state have an excellent reactivity with harmful gases and harmful substances in a fluid containing harmful substances. When the foregoing molecules in the excited state and harmful substances are brought into contact with one another, electron transfer reactions take place between the harmful substances and the foregoing molecules. As a result, the reactions of decomposing the harmful substances proceed.

Since the carbon soot molecules, metal phthalocyanin complexes and metal porphyrin complexes in the excited state have the excellent reactivity with the harmful substances, the foregoing molecules have ability of decomposing the harmful substances superior to that of conventional decomposing catalysts. Therefore, the carbon soot molecules, metal phthalocyanin complexes and metal porphyrin complexes in the excited state exhibit excellent decomposing activity even in a low temperature state.

The method of decomposing harmful substances according to the present invention decomposes the harmful substances by making use of active oxygen obtained by the carbon soot molecules, metal phthalocyanin complexes and metal porphyrin complexes in the excited state or by direct contact reactions of the carbon soot molecules, metal phthalocyanin complexes and metal porphyrin complexes in the excited state. The method of decomposing harmful substances according to the present invention is able to decompose more various substances and higher efficiency with respect to the conventional method.

The harmful substances that can be decomposed by the method according to the present invention are exemplified by: harmful gases such as NOx, SOx and CO; malodor component gas containing, for example, ammonium, aldehyde or mercaptan; and fluids, such as a water solution of acetic acid, trihalomethane, and water including musty odorant material such as geosmine or 2-methyl-isoborneol.

The excited state of the carbon soot molecules, metal phthalocyanin complexes and metal porphyrin complexes is realized by making use of a physico-chemical method, such as light irradiation, injection of electrons caused by electrodes or a reducing reaction realized by an electron donor. In this case, the needed energy can be considerably reduced as compared with a conventional ozone generation process. Further, the reactions are able to proceed at low temperatures, and therefore, an energy saving and small size apparatus for manufacturing active oxygen and an apparatus for decomposing the harmful substances can be provided.

Although ozone that has been used is stable for several to tens of hours when it is generated once and there sometimes arises an adverse influence upon the human body, the active oxygen manufactured by the method according to the present invention has a short life and is changed to oxygen molecules in a short time. Therefore, an adverse influence upon the human body can be eliminated, and accordingly, it can be used as an effective substance for use in the method and the apparatus for decomposing the harmful substances, such as NOx, SOx, CO and malodor substances in the places, in which a human being acts, such as indoors.

Since the active oxygen has a short life as described above, there arises a necessity of performing instantaneously the reactions with the harmful substances. Therefore, the gas phase or liquid phase harmful substances can be decomposed to be made harmless by using an apparatus that is able to cause oxygen-contained gas and the harmful gas to simultaneously flow to fullerenes molecule film if the harmful substance is in the form of a gas. If the harmful substances are contained by a fluid, an apparatus is used which comprises an ejector and which is capable of bringing the foregoing fluid into contact with the active oxygen at high speed and mixing them.

Further, a sensor, which sensitizes the substance to be processed, is disposed at the harmful gas introduction port and the fluid introduction port of the decomposing apparatus. If the concentration of the substance to be process has exceeded a predetermined level, the light source portion is turned on or voltage is supplied to the electrode or the electron donor is introduced so that the carbon soot molecules, the metal phthalocyanin complexes and the metal porphyrin complexes are brought into the excited state to decompose the harmful substances. As a result, an apparatus capable of continuously decomposing the harmful gas and the fluid containing the harmful substances can be provided.

EXAMPLE 1

An example of the present invention will now be described. First, a method of forming a thin film or a solidified film of the carbon soot molecules will now be described. If the thin film of the carbon soot molecules is formed, the carbon soot molecule thin film having a thickness about 50 to 200 nm is formed on a film or an electrode by using a vacuum evaporation method, an ICB evaporation method, a casting method or a spin coating method or the like. The material of the film is not limited particularly, and therefore, it may be a usual film made of, for example, polyimide, polyamidoimide, aromatic polyamide, polycarbonate or polyester. As the electrode, a metal electrode made of gold or aluminum may be used. By subjecting the film or the electrode, on which the thin film has been formed, to a post-process, such as an ion injection process or a heating process, a further excellent thin film can be formed. If the solidified film of the carbon soot molecules is formed, powder of the carbon soot molecules is formed into paste to be applied so that the solidified film is formed. In this case, an inorganic binder, for example, a low-melting-point glass is used to be heated until it is melted into the form of the paste which is being then applied to the film or the plate. The lower limit of the thickness of the solidified film of the carbon soot molecules is about 100 $\mu$m because of the forming method.

Then, a method and an apparatus for preparing the active oxygen according to the present invention will now be described.

Figure 1:
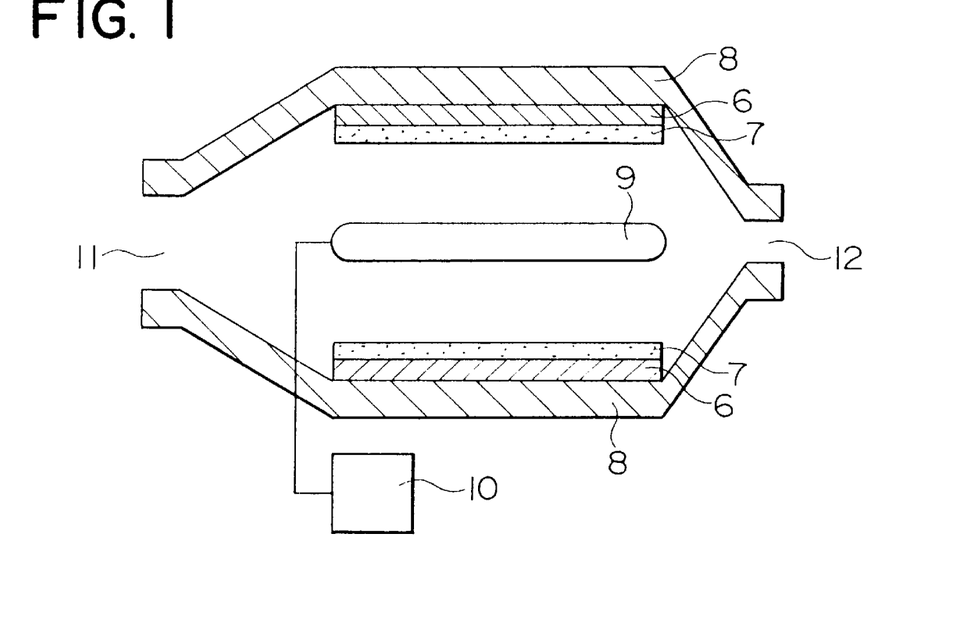
FIG. 1 is a schematic cross sectional view which illustrates an apparatus for preparing active oxygen according to the present invention.

FIG. 1 is a cross sectional view which illustrates an example of the apparatus for preparing the active oxygen. In the drawings, the reference numerals represent the same or equivalent elements. A thin film or a solidified film 7 of the carbon soot molecules is applied to the surface of a film 6. The film 6 is placed in a container 8 having a gas introduction port 11 and a gas discharge port 12. The thin film or the solidified film 7 of the carbon soot molecules is excited by light beams emitted from a light source portion 9. The light source portion 9 is operated by a power source 10.

Then, the description will be made about a process in which the thin film or the solidified film 7 of the carbon soot molecules formed on the film 6 as described above is placed on the inside of the container 8. Although the material of the container 8 is not limited particularly, stainless steel was employed in the following examples. Then, the light source portion 9 for irradiating the thin film or the solidified film 7 of the carbon soot molecules disposed on the inside of the container 8 with light is disposed. It is preferable that the light source portion 9 is able to uniformly irradiate the thin film or the solidified film 7 of the carbon soot molecules with light. The light source portion 9 is not limited particularly so far as it is capable of irradiating the film with light having a wavelength of 200 to 600 nm. For example, a xenon lamp, a tungsten lamp, a mercury lamp or a deuteride lamp may be employed. As an alternative to this, a laser beam source capable of emitting light having the foregoing wavelength range may be employed, for example, an Eximer laser, a higher harmonic YAG laser, a higher harmonic YAG pigment laser, an Ar laser, a higher harmonic Ar pigment laser may be used.

It is preferable that the internal shape of the container 8 and the outer shape of the thin film or the solidified film 7 of the carbon soot molecules are designed in such a manner that the reactions between oxygen in the gas introduced through the gas introduction port 11 and the carbon soot molecules in the state excited by light to proceed efficiently.

The operation of the apparatus for preparing the active oxygen shown in FIG. 1 will now be described. First, mixed gas of oxygen gas or gas containing oxygen, such as air, and inactive gas is introduced through the gas introduction port 11 to flow in such a manner that the mixed gas is brought into contact with the surface of the thin film or the solidified film 7 of the carbon soot molecules. When the light source portion 9 is turned on at this time, the carbon soot molecules in the thin film or the solidified film 7 are excited by light. The carbon soot molecules thus-excited by light are reacted with oxygen so that singlet oxygen which is one of the active oxygen group is generated. The singlet oxygen is taken out through the gas discharge port 12 to be used in another purpose, such as the decomposing reaction with the harmful substances.

EXAMPLE 2

The apparatus for preparing the active oxygen shown in FIG. 1 is arranged in such a manner that a polyimide film was used as the film 6, an evaporated film of $C_{60}$ fullerene molecules was used as the thin film or the solidified film 7 of the carbon soot molecules and the xenon lamp was used as the light source portion 9. While irradiating the $C_{60}$ fullerene molecules with the xenon lamp beams, air was introduced through the gas introduction port 11 so that the excited fullerene molecules and oxygen in air were reacted with one another at the room temperature. The light in the infrared-ray region emitted from the gas taken through the gas discharge port 12 was analyzed, resulting in that presence of the singlet oxygen was observed. Thus, satisfactory generation of the singlet oxygen due to the $C_{60}$ fullerene molecules excited by light was confirmed.

EXAMPLE 3

Figure 2:
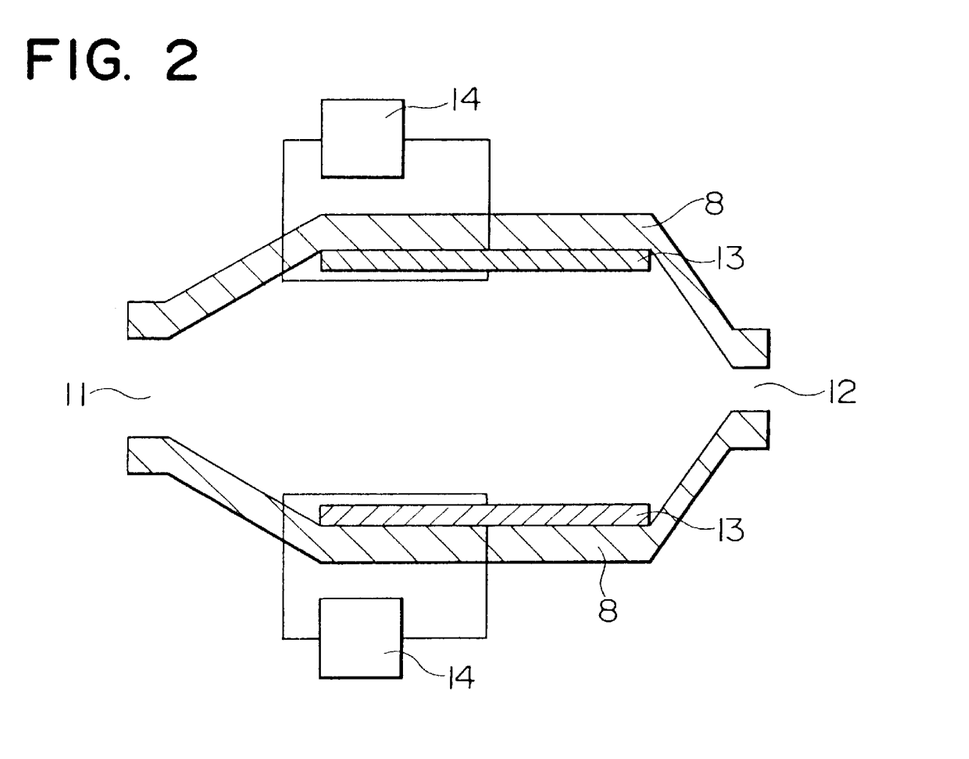
FIG. 2 is a schematic cross sectional view which illustrates another apparatus for preparing active oxygen according to the present invention.

Another example of the method and the apparatus for preparing the active oxygen according to the present invention will now be described. FIG. 2 is a cross sectional view which illustrates an example of the apparatus for preparing active oxygen. An electrode portion 13 holds the thin film or the solidified film 7 of the carbon soot molecules and injects electrons into the same. The electrode portion 13 is disposed in a container having the gas introduction port 11 and the gas discharge port 12. A power source 14 applies voltage to the electrode portion 13 to inject electrons into the electrodes 13.

The apparatus for preparing active oxygen shown in FIG. 2 has an arrangement that the apparatus for preparing active oxygen shown in FIG. 1 is arranged in such a manner that the electrode portion 13 for injecting electrons into the thin film or the solidified film 7 of the carbon soot molecules and the power source portion 14 for applying voltage and injecting electrons into the electrode portion 13 were employed in place of the light source portion 9 and the power source portion 10.

Figure 3:
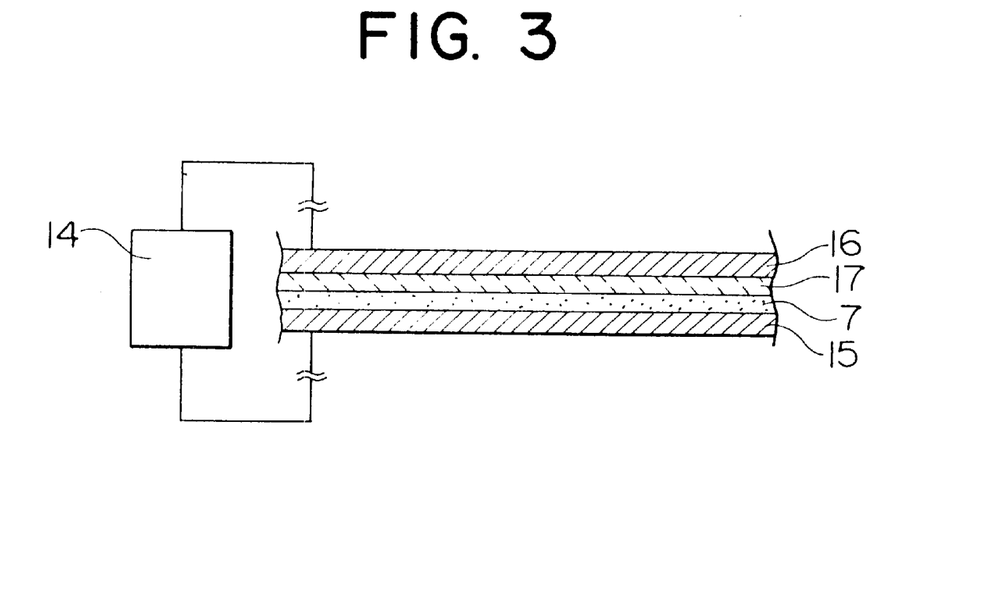
FIG. 3 is a cross sectional view which illustrates an electrode portion according to the present invention.

The structure of the electrode portion 13 is shown in FIG. 3 which is a cross sectional view. Referring to FIG. 3, the thin film or the solidified film 7 of the carbon soot molecules is formed on an electrode 15 made of gold, platinum, silver, aluminum, ITO or $SnO_2$. Further, an electrode 16 has a thin film of a solid electrolyte exhibiting excellent ion conductivity formed thereon. When voltage is, by the power source 14, applied between the electrodes 15 and 16, electrons and ions transfer between the electrode 15 and a solid electrolyte so that electrons are injected into the thin film or the solidified film 7 of the carbon soot molecules. As a result, the carbon soot molecules receive the electrons as to be excited. By forming a very thin film of the carbon soot molecules on the electrode 15 or by making the electrode 15 on which the thin film or the solidified film 7 of the carbon soot molecules or the overall body of the electrode portion to be porous, the degree of contact between the carbon soot molecules and the gas is raised so that the carbon soot molecules in the excited state can be used with the reactions with the gas.

The operation of the apparatus for preparing active oxygen shown in FIG. 2 will now be described. First, mixed gas of oxygen gas of gas containing oxygen, such as air, and inactive gas is introduced through the gas introduction port 11 to flow in such a manner that the mixed gas is brought into contact with the electrode that is holding the thin film or the solidified film 7 of the carbon soot molecules. When voltage is applied to the electrode portion 13, the carbon soot molecules in the thin film or the solidified film 7 are excited. The carbon soot molecules thus-excited are reacted with oxygen so that singlet oxygen which is one of the active oxygen group is generated. The singlet oxygen atoms are taken out through the gas discharge port 11 to be used in another purpose, such as the decomposing reaction with the harmful substances.

EXAMPLE 4

The apparatus for preparing active oxygen shown in FIG. 2 was arranged in such a manner that a gold electrode was used as the electrode and it was formed into a porous electrode portion 13, the $C_{60}$ fullerene molecules evaporated film was used as the thin film or the solidified film 7 of the carbon soot molecules, air was introduced through the gas introduction port 11 while supplying electrons to the $C_{60}$ fullerenes molecules evaporated film, and excited $C_{60}$ fullerenes molecules and oxygen in air were reacted in room temperature. Similarly to Example 2, presence of singlet oxygen was confirmed in the gas taken out through the gas discharge port 12. Therefore, a fact was confirmed that singlet oxygen is generated by the $C_{60}$ fullerene molecules excited by the injection of electrons performed by the electrode portion 13.

Although the only the electrode 15 of the electrode portion 13 was made porous, the structure is not limited to this. The electrode portion may be designed in such a manner that the overall body of the electrode is made porous to cause the electrode portion to exhibit excellent gas permeability. In this case, a similar effect can be obtained.

EXAMPLE 5

Figure 4:
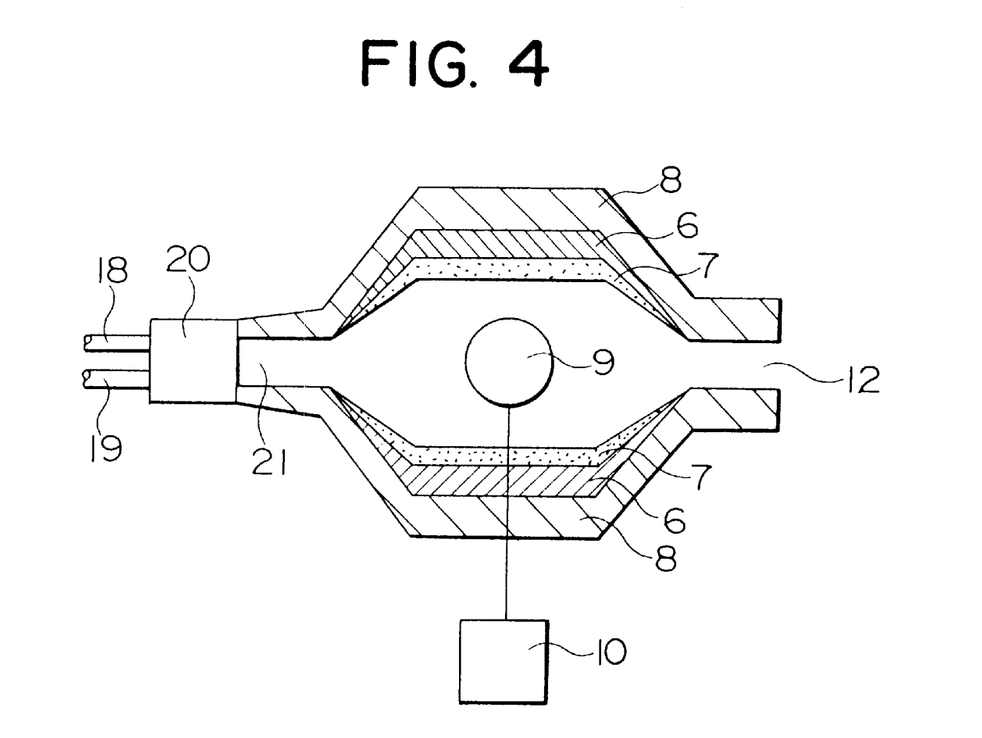
FIG. 4 is a schematic cross sectional view which illustrates an apparatus for decomposing a harmful gas according to the present invention.

An example of a method and an apparatus for decomposing harmful substances arranged to use active oxygen to decompose the harmful substances according to the present invention will now be described. FIG. 4 is a cross sectional view which illustrates an example of an apparatus for decomposing the harmful gas. The apparatus for decomposing the harmful gas shown in FIG. 4 is different from the apparatus for preparing active oxygen in that a harmful gas introduction port 18 for introducing the gas to be processed into the container 8 is formed together with the gas introduction port 19 and that a gas mixing portion 20 is formed downstream from the foregoing two introduction ports. It should be noted that the apparatus shown in FIG. 4 has the arrangement that the film 6, the thin film or the solidified film 7 of the carbon soot molecules, the light source portion 9 and the power source portion 10 are structured to be substantially the same as those of the apparatus shown in FIG. 1. Further, the mixed gas mixed in the gas mixing portion 20 is caused to be introduced to the surface of the thin film or the solidified film 7 of the carbon soot molecules placed on the inner surface of the container 8 having a fluid passage so designed that the decomposing reactions proceed efficiently.

The operation of the apparatus for decomposing the harmful gas shown in FIG. 4 will now be described. First, the harmful gas is introduced through the harmful gas introduction port 18 to be mixed with the mixed gas of the oxygen gas or the gas, such as air, containing oxygen and the inactive gas introduced through the gas introduction port 19 in order to cause the decomposing reactions to proceed efficiently in accordance with the composition of the harmful gas. The harmful gas is introduced into the container 8, that is, a decomposition reaction phase, via a mixed gas introduction portion 21, the harmful gas being allowed to flow as to be brought into contact with the surface of the thin film or the solidified film 7 of the carbon soot molecules. When the light source portion is turned on at this time, the carbon soot molecules are excited. The excited carbon soot molecules react with oxygen exists together with the harmful gas so that singlet oxygen, which is one of the active oxygen group, is generated. Since the singlet oxygen exhibits excellent reactivity, the singlet oxygen reacts with the harmful substance in the harmful gas. As a result, the harmful gas can be decomposed, the decomposed gas being then discharged through the gas discharge port 12.

EXAMPLE 6

The apparatus for decomposing the harmful gas shown in FIG. 4 was arranged in such a manner that a polyimide film was used as the film 6, an evaporated film of $C_{60}$ fullerene molecules was used as the thin film or the solidified film 7 of the carbon soot molecules and a xenon lamp was used as the light source portion 9. In a state where the fullerenes molecule evaporated film was irradiated with the xenon lamp light, gas containing acetoaldehyde having a concentration of about 1000 ppm or less was introduced through the harmful gas introduction port 18 at a speed ranging from 100 ml/minute to 1000 ml/minute. Air was introduced through the air introduction port 19 at a flow velocity of about ⅕ to ¹⁄₁₀ of the gas containing acetoaldehyde. The two introduced gases were mixed in the gas mixing portion 20, the mixed gas being then introduced into the container 8 via the mixed-gas introduction portion 21 so that the mixed gas was, at room temperature, allowed to react with the $C_{60}$ fullerene molecules excited by light. The gas discharged through the gas discharge port 12 was analyzed by a mass analysis method and a gas chromatography, resulting in a confirmation made that about 80% of the introduced acetoaldehyde was decomposed to $CO_2$ and $H_2O$. As contrasted with a case where no air was introduced through the gas introduction port resulting in that the decomposition of acetoaldehyde into $CO_2$ and $H_2O$ was about 10%, a fact was confirmed that singlet oxygen generated by the $C_{60}$ fullerene molecules excited by light caused acetoaldehyde to be decomposed to $CO_2$ and $H_2O$.

EXAMPLE 7

Figure 5:
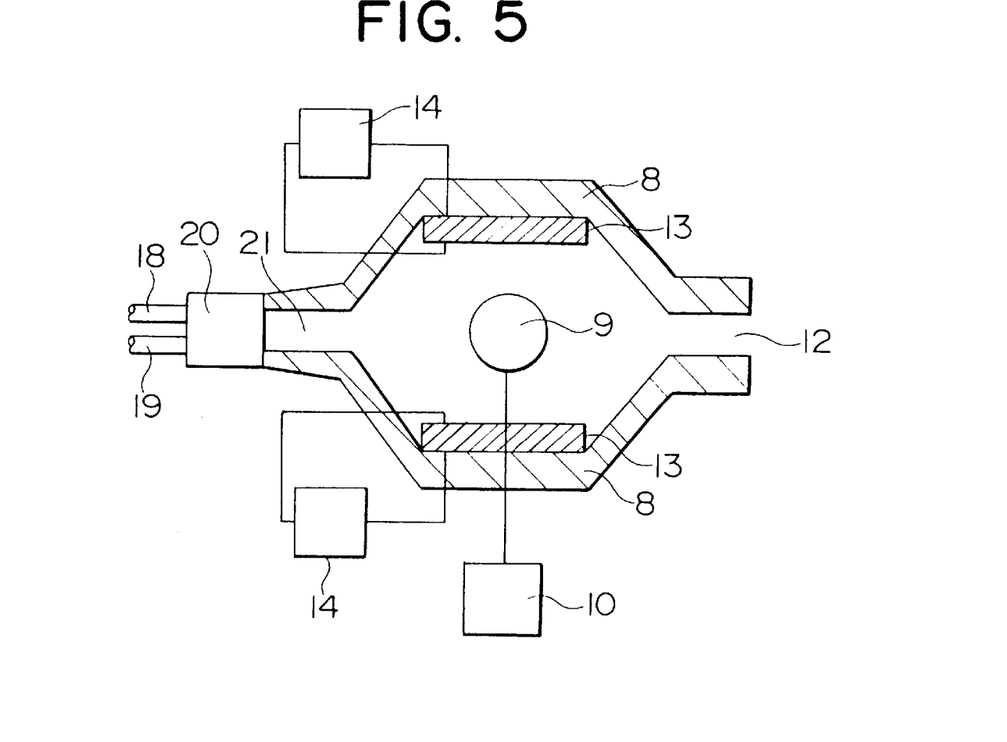
FIG. 5 is a schematic cross sectional view which illustrates another apparatus for decomposing a harmful gas according to the present invention.

A method and apparatus for decomposing the harmful substances in such a manner that excited molecules were directly used to decompose the harmful substances contained in harmful gas according to the present invention will now be described. FIG. 5 is a cross sectional view which illustrates an example of the apparatus for decomposing the harmful gas. The apparatus for decomposing the harmful gas shown in FIG. 5 comprises the electrode 13 and its power supply portion 14 according to Example 3 in addition to the light source portion 9 for enhancing the excitation of carbon soot molecules. It should be noted that the electrode portion 13 comprises a transparent electrode so as not to inhibit the exciting effect of the carbon soot molecules expected to be obtained by the irradiation of light. In the apparatus shown in FIG. 5, the thin film or the solidified film 7 of the carbon soot molecules, the light source portion 9, the power source portion 10, the harmful gas introduction port 18 and the gas introduction port 19 are structured to be substantially the same as those of the apparatus shown in FIG. 4. The structure is arranged in such a manner that the mixed gas mixed in the gas mixing portion 20 is introduced into the electrode portion 13 for holding the thin film or the solidified film 7 of the carbon soot molecules placed on the inner surface of the container having the designed fluid passage through which the decomposition reaction proceeds efficiently.

The operation of the apparatus for decomposing the harmful gas shown in FIG. 5 will now be described. The harmful gas is introduced through the harmful gas introduction port 18. An inactive gas serving as a dilution gas for diluting the concentration of the harmful gas for the purpose of causing the decomposing reaction to proceed efficiently is introduced through the gas introduction port 19, the inactive gas containing no oxygen. The foregoing two gases are mixed in the gas mixing portion 20 before the mixed gas is introduced through the mixed gas introduction portion 21 into the container 8, that is, the decomposing reaction phase. The mixed gas flows in such a manner that it is brought into contact with the electrode portion which holds the thin film or the solidified film 7 of the carbon soot molecules. When the light source portion 9 is turned on and voltage is applied to the electrode portion 13 at this time, the carbon soot molecules are excited. The excited carbon soot molecules directly react with the harmful substances contained in the harmful gas so that the harmful substances are decomposed. The decomposed gas is discharged through the gas discharge port 12.

EXAMPLE 8

Figure 6:
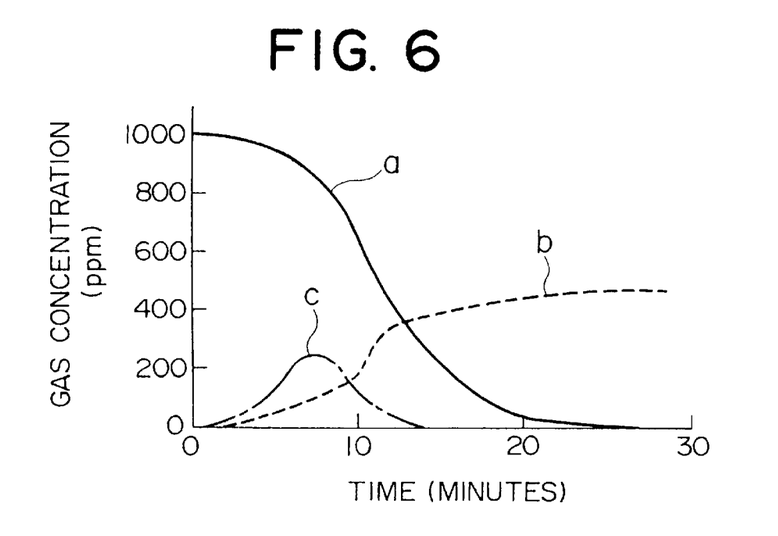
FIG. 6 is a characteristic graph showing decomposition of NO performed by the apparatus for decomposing a harmful gas according to the present invention.

The apparatus for decomposing the harmful gas shown in FIG. 5 was arranged in such a manner that ITO (Indium Tin Oxide) was used as the transparent electrode, a porous electrode portion 13 was used in place of the electrode 15, the $C_{60}$ fullerene molecules evaporated film was used as the thin film or the solidified film 7 of the carbon soot molecules, and a xenon lamp was used as the light source portion 9. Gas containing NO at a concentration of about 500 ppm or lower was introduced through the harmful gas introduction port 18, and argon gas was introduced as the diluting gas through the gas introduction port 19 at a flow velocity about 1/5 to 1/10 of the gas containing NO. The two gases were mixed in the gas mixing portion 20, the mixed gas being then introduced into the container 8 through the mixed gas introduction portion 21 of the container 8. Then, the harmful gas introduction port 18, the gas introduction port 19 and the gas discharge port were closed by using valves or the like so that a sealed state was realized. The fullerene molecules evaporated film was irradiated with xenon lamp beams to excite the $C_{60}$ fullerene molecules. The $C_{60}$ fullerene molecules were allowed to react with the mixed gas at room temperature. The gas in the container 8 was analyzed with time by the mass analysis method and the gas chromatography. The state of the decomposition of NO is shown in characteristics graph shown in FIG. 6. In FIG. 6, the axis of abscissa stands for time, the axis of ordinate stands for the concentration of the gas, and curves a, b, c respectively stand for NO, $N_2$ and $N_2O$. As shown in FIG. 6, a fact was confirmed that NO was first converted to $N_2O$ and then substantially completely decomposed to $N_2$ in 20 minutes after the reactions had taken place.

EXAMPLE 9

The apparatus for decomposing the harmful gas shown in FIG. 5 was arranged in such a manner that ITO was used as the transparent electrode, a porous electrode portion 13 was used in place of the electrode 15, the $C_{60}$ fullerene molecules evaporated film was used as the thin film or the solidified film 7 of the carbon soot molecules, and a xenon lamp was used as the light source portion 9. In a state where voltage was applied to the electrode, gas containing NO at a concentration of about 500 ppm or lower was introduced through the harmful gas introduction port 18 at a speed ranging from 100 ml/minute to 1000 ml/minute, and argon gas was introduced as the diluting gas through the gas introduction port 19 at a flow velocity about 1/5 to 1/10 of the gas containing NO. The two gases were mixed in the gas mixing portion 20, the mixed gas being then introduced into the container 8 through the mixed gas introduction portion 21 of the container 8. The mixed gas was then allowed to react with the $C_{60}$ fullerene molecules at room temperature. The gas discharged through the gas discharge port 12 was analyzed by the mass spectrograph and the gas chromatography. As a result a fact was confirmed that the introduced NO was substantially completely decomposed to $N_2$ similarly to Example 6. The foregoing decomposition was stably continued for tens of hours. As a result, a fact was confirmed that the $C_{60}$ fullerene molecules excited by applied light or by electrons injected by the electrode and NO directly reacted with one another to be formed into $N_2O$, and then $N_2O$ was decomposed to $N_2$. Further, the foregoing decomposition was stably held.

EXAMPLE 10

Figure 7:
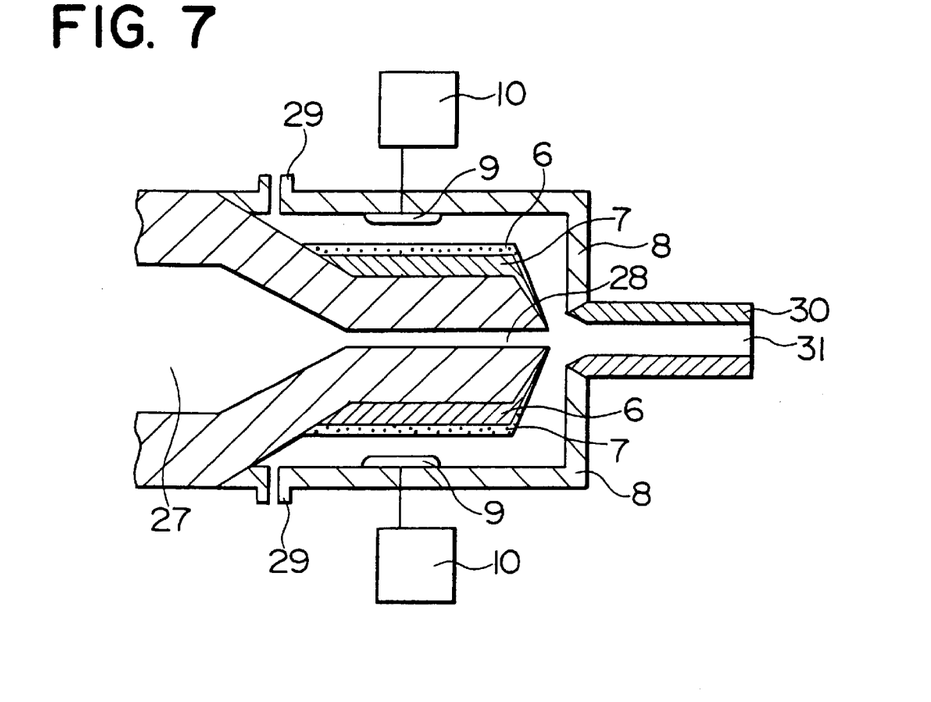
FIG. 7 is a schematic cross sectional view which illustrates an apparatus for decomposing a fluid containing harmful substances according to the present invention.

An example of the method and an apparatus for decomposing the harmful substances arranged in such a manner that the decomposition of the harmful substances contained in a fluid is performed by making use of active oxygen will now be described. FIG. 7 is a cross sectional view which illustrates an example of the apparatus for decomposing the harmful substances contained in a fluid. Referring to FIG. 7, a port 27 for supplying fluid to be processed for introducing the fluid containing the harmful substances is formed. A nozzle 28 disposed in the container 8 has a narrowed inner diameter as to be capable of jetting a fluid to a throat portion 30 at high speed. The foregoing elements and a throat (reaction portion) 31 constitute an ejector. The nozzle 28 has, on the outer surface thereof, the thin film or the solidified film 7 of the carbon soot molecules applied to the film 6. A plurality of the light source portions 9 are disposed for the purpose of uniformly irradiating the thin film or the solidified film 7 of the carbon soot molecules with light. Further, a plurality of gas introduction ports 29 may be formed for the purpose of introducing the mixed gas of oxygen gas or gas, such as air, containing oxygen and the inactive gas. Active oxygen generated by the fullerene molecules excited with light is received by the throat portion 30 with the fluid jetted from the nozzle 28 of the port 27 at high speed, the active oxygen being then instantaneously mixed with fluid in the throat (the reaction portion) 31. Then, fluid, the harmful substances of which have been decomposed, is discharged through the fluid discharge port 31. By arranging the structure in such a manner that the active oxygen is instantaneously mixed with the fluid by making use of the ejector, the active oxygen suffering from a short life can effectively be used.

EXAMPLE 11

The apparatus for decomposing the fluid containing the harmful substances shown in FIG. 7 was arranged in such a manner that a polyimide film was used as the film 6, $C_{60}$ fullerene molecules and $C_{70}$ fullerene molecules were mixed as the thin film or the solidified film 7 of the carbon soot molecules, low-melting-point glass was added as a binder, and the foregoing material was heated to be formed into paste. The paste was applied to the polyimide film to have a thickness of about 100 $\mu$m so that a solidified film was used, and a xenon lamp was used as the light source portion. An acetic acid water solution, the concentration of which was about tens of ppm was, as the fluid containing the harmful substances, introduced through the port 27 for supplying fluid to be processed. Further, the fullerene molecules were irradiated with light emitted from the xenon lamp to be excited. In this state, air was introduced through the gas introduction port 29 to generate the singlet oxygen, which is one of the active oxygen group. The singlet oxygen was then brought into contact with the acetic acid water solution jetted from the nozzle to be mixed with each other. The composition of the reacted solution was analyzed by a fluid chromatography, while the composition of the generated gas was analyzed by gas chromatography. As a result, a fact was confirmed that substantially 100% of the introduced acetic acid was decomposed to $CO_2$ and $H_2O$. A fact was confirmed that acetic acid was decomposed to $CO_2$ and $H_2O$ by singlet oxygen generated by the $C_{60}$ fullerene molecules excited by applied light.

EXAMPLE 12

Figure 8:
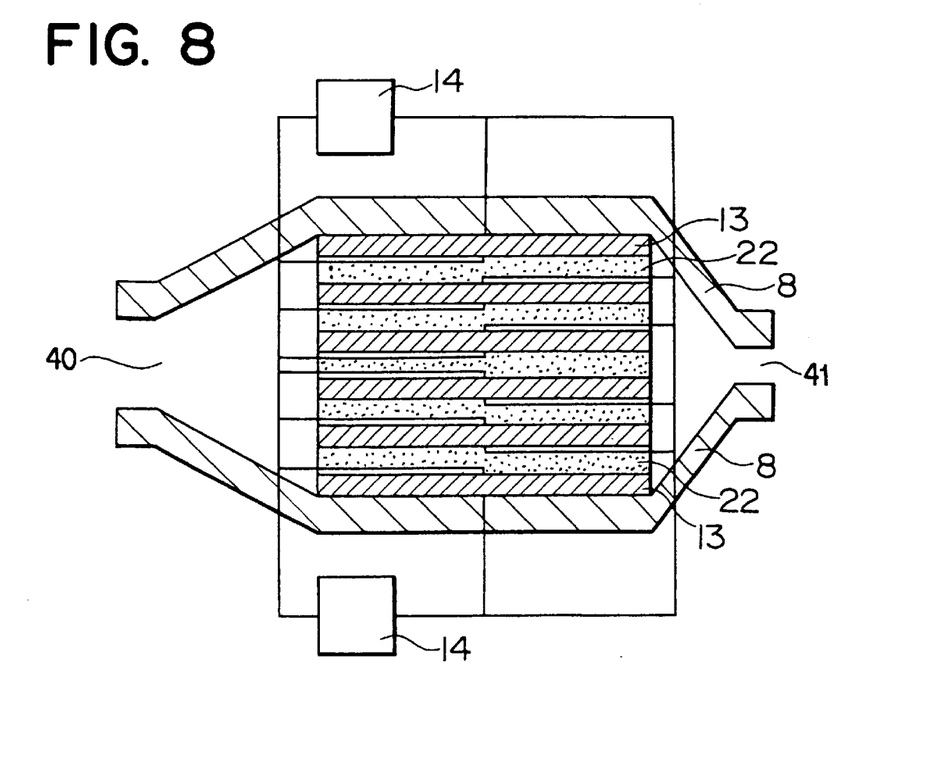
FIG. 8 is a schematic cross sectional view which illustrates another apparatus for decomposing a fluid containing harmful substances according to the present invention.

An example of a method and an apparatus for decomposing the harmful substance that directly make use of excited molecules to decompose the harmful substances contained in a fluid according to the present invention will now be described. FIG. 8 is a cross sectional view which illustrates an example of the apparatus for decomposing the fluid containing the harmful substances. Referring to FIG. 8, the electrode 13 according to Example 3 is secured to an insulating member 22 and disposed in the container 8. The power source 14 applies voltage to the electrode portion 13 to inject electrons into the electrode portion 13. The container 8 has, on the two ends thereof, a fluid introduction port 40 and a fluid discharge port 41. In this case, the electrode portion 13 was designed in such a manner that the solid electrolyte portion 17 shown in FIG. 3 is made hollow to directly receive the fluid containing the harmful substances, which are the electrolyte. Further, a plurality of the electrode portion 13 were secured by using the insulating member 22 to efficiently introduce the fluid into the respective electrodes so that the harmful substances contained in the fluid and the excited carbon soot molecules are allowed to efficiently react with one another.

The operation of the apparatus for decomposing the fluid containing the harmful substances shown in FIG. 8 will now be described. First, the fluid containing the harmful substances is received through the fluid introduction port 40, and then the fluid flows into the electrode in such a manner that the fluid comes in contact with the surface of the thin film or the solidified film 7 of the carbon soot molecules held by the electrode. When voltage is applied to the electrode at this time, the carbon soot molecules are excited and the excited carbon soot molecules react with the harmful substances contained in the fluid, causing the decomposing reactions to take place. Then, the decomposed fluid is discharged through the fluid discharge port 41.

EXAMPLE 13

The apparatus for decomposing the fluid containing the harmful substances shown in FIG. 8 was arranged in such a manner that the electrode portion 13 comprising the gold electrode was used, $C_{60}$ fullerene molecules and $C_{70}$ fullerene molecules were mixed as the thin film or the solidified film 7 of the carbon soot molecules, low-melting-point glass was added as a binder, and the foregoing material was heated to be formed into paste. The paste was applied to the surface of the gold electrode to have a thickness of about 100 $\mu$m so that a solidified film according to this example was obtained. An acetic acid solution having a concentration of about tens of ppm was, as the fluid containing the harmful substances, introduced through the fluid supply port 27, and voltage was applied to the electrode to excite the fullerene molecules so that the contact reactions were caused to take place. The composition of the reacted solution was analyzed by a fluid chromatography, while the composition of the generated gas was analyzed by gas chromatography. As a result, a fact was confirmed that substantially 100% of the introduced acetic acid was decomposed to $CO_2$ and $H_2O$. A fact was confirmed that acetic acid was decomposed to $CO_2$ and $H_2O$ by $C_{60}$ fullerene molecules excited by electrons injected by the electrode.

EXAMPLE 14

Figure 9:
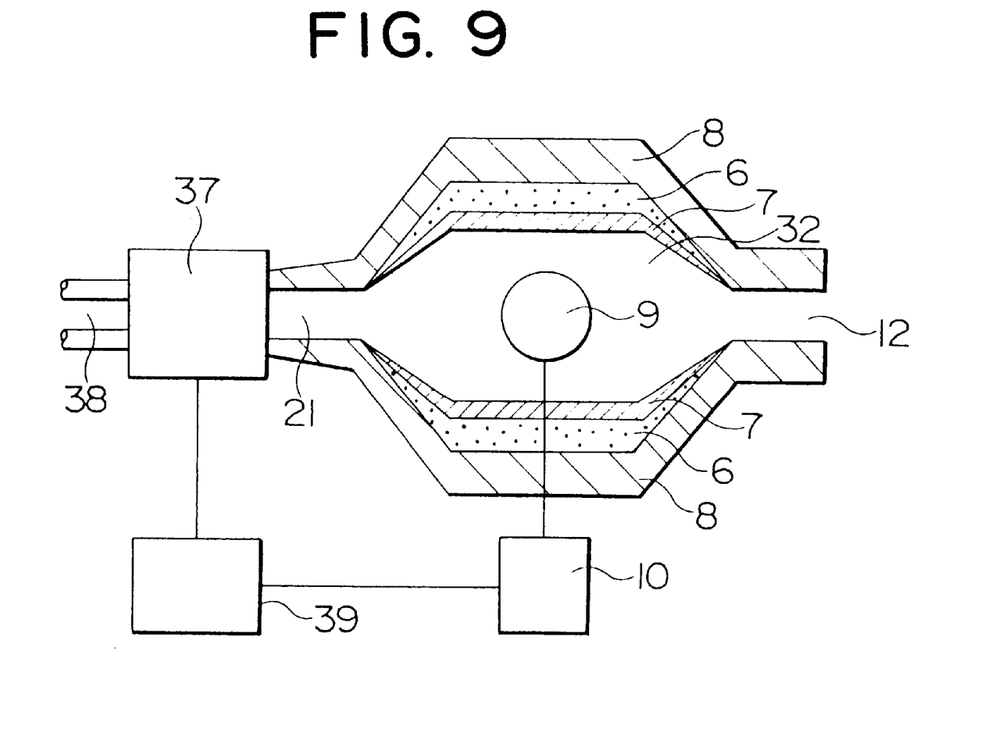
FIG. 9 is a schematic cross sectional view which illustrates a continuous decomposing apparatus for decomposing the harmful gas according to the present invention.

An example of an apparatus for continuously decomposing the harmful substances according to the present invention will now be described. FIG. 9 is a cross sectional view which illustrates an example of the apparatus for continuously decomposing the harmful gas. The continuous decomposition apparatus according to this embodiment is arranged to be capable of decomposing indoor combustion exhaust gas. A decomposition reaction phase portion 32 has substantially the same structure as that shown in FIG. 4, the structure comprising the film 6, the thin film or the solidified film 7 of the carbon soot molecules, the container 8, the light source portion 9, the power supply portion 10, an indoor gas introduction port 38, a sensor portion 37 and a control portion 39. The gas introduced through the indoor gas introduction port 38 is subjected to a detection process in the sensor portion 37 whether or not a predetermined type of the gas is present and whether or not a gas having a concentration higher than a predetermined level is present. If the presence has been confirmed, the control portion 39 that receives a signal from the sensor portion 37 transmits a signal to the power supply portion 10 to turn on the light source portion 9. As a result, the carbon soot molecules are excited by light, and the operations similar to those performed by the apparatus shown in FIG. 4 are performed. As a result, the harmful substances contained in the gas can be continuously decomposed if necessary.

If the apparatus is arranged in such a manner that the sensor portion 37 comprises a detector which sensitizes NOx, the apparatus is able to detect a state where the indoor concentration of NOx has reached a level that is harmful for the human body and performs the decomposition reactions.

The sensor for use in the sensor portion 37 may be a carbon monoxide sensor, a hydrocarbon sensor, a SOx sensor, an odor sensor or a general sensor in place of the NOx sensor. If the foregoing apparatus is disposed in a vehicle compartment in place of the indoor place, it can be used as an apparatus for decomposing engine exhaust gas introduced from outside of the vehicle or a general gas decomposing apparatus for decomposing smoke from cigarette.

If the sensor portion 37 is disposed at the fluid introduction port 27 of the apparatus shown in FIG. 7, the apparatus can be used as an apparatus to decompose continuously the harmful substances in a fluid if necessary.

Although the $C_{60}$ fullerenes molecules and $C_{70}$ fullerene molecules were used as the carbon soot molecules in the foregoing example, the carbon soot molecules are not limited to this. Other fullerene molecules, carbon nanotubes and $C_{18}$ to $C_{58}$ spherical shell molecules may be used to obtain a similar effect.

EXAMPLE 15

When chloro-tetraphenylporphinato chromium (III) or ruthenium phthalocyanin, each of which is one of the metal porphyrin complexes, was used as the material for manufacturing active oxygen and decomposing the harmful substances, and an apparatus having a similar structure to that of the apparatus that makes use of carbon soot molecules was constituted to cause oxygen or a harmful gas containing the harmful substances and the fluid to reach with each other, a similar effect was obtained to that obtained from the case where the carbon soot molecules were used. As a result, a fact was confirmed that excited chloro-tetraphenylporphinato chromium (III) or ruthenium phthalocyanin enabled active oxygen to be generated and the harmful substances to be decomposed.

Although Example 15 uses chloro-tetraphenylporphinato chromium (III) or ruthenium phthalocyanin as the metal porphyrin complexes and the metal phthalocyanin complexes, the present invention is not limited to this. For example, the following metal porphyrin complexes or the metal phthalocyanin complexes may be used to obtain a similar effect: metal porphyrin complexes, the porphyrin ring of which has a saturated hydrocarbon chain and a unsaturated hydrocarbon chain, and which is expressed by Chemical Formula (1); metal porphyrin complexes, the porphyrin ring of which has a phenyl group and which is expressed by Chemical formula (2); or metal phthalocyanin complexes, the phthalocyanin ring of which has a saturated hydrocarbon chain and an unsaturated hydrocarbon chain and which is expressed by Chemical Formula (3).

(1)

where

M: central metal $R_1$, $R_2$: axial ligand such as Cl, Br, OH, phosphoric acid, imidazole, pyridine or pyridine derivative $R_3R_4$: alkyl chain having 1 to 30 carbon atoms $R_5R_6$: alkyl chain having 1 to 30 hydrogen or carbon atoms, and $R_1$, $R_2$ are categorized to three types respectively having coordination numbers of 2, 1 and zero depending upon the valence of the central metal.

(2)

where

M: central metal $R_1$, $R_2$: axial ligand such as Cl, Br, OH, phosphoric acid, imidazole, pyridine or pyridine derivative and $R_1R_2$ are categorized to three types respectively having coordination numbers of 2, 1 and zero depending upon the valence of the central metal.

(3)

where
M: central metal
$R_1$, $R_2$: axial ligand such as Cl, Br, OH, phosphoric acid, imidazole, pyridine or pyridine derivative
$R_3$ to $R_{18}$: alkyl chain having 1 to 30 carbon atoms or hydrogen atoms, and $R_1R_2$ are categorized to three types respectively having coordination numbers of 2, 1 and zero depending upon the valence of the central metal.

Although the carbon soot molecules, the metal porphyrin complexes and the metal phthalocyanin complexes are excited by applied light or injected electrons in the foregoing examples, the exciting method is not limited to this. A reducing reaction using reducing gas, such as hydrogen or a combination of the reducing reaction and the light irradiation and electron injection using the electrode enables a similar or super effect to be obtained.

Although the carbon soot molecules, the metal porphyrin complexes and the metal phthalocyanin complexes are formed into the thin film or the solidified film in the foregoing examples, the form is not limited to this. Another structure may be employed in which powder of the foregoing molecules is held by a carrier such as activated carbon and they are enclosed in a column. In this case, a similar effect can be obtained.

Although the carbon soot molecules, the metal porphyrin complexes and the metal phthalocyanin complexes are solely used in the foregoing examples, the method of use is not limited to this. If the two or more kinds of materials are used in a mixed manner, a similar or superior effect can be obtained.

Although the active oxygen is manufactured and the harmful substances are decomposed at room temperature in the foregoing embodiment, it is preferable that similar reactions are caused to proceed by raising the temperature by using a heater and a temperature control unit in the reaction apparatus because the reactions of generating active oxygen and the reactions of decomposing the harmful substances are enhanced.

In the foregoing examples, acetoaldehyde, NO and acetic acid are decomposed as the harmful substances to be decomposed. However, the present invention is not limited to the foregoing substances. For example, SOx, CO, ammonia and mercaptan in a gas and trihalomethane, diosmine, 2-methylisobornale in a fluid can be decomposed although obtainable effect differs depending upon the type and the concentration of the substance to be decomposed.

If solid harmful substances are placed at an arbitrary position in the container 8 of the apparatus for preparing active oxygen shown in FIG. 1, the solid harmful substances can be decomposed.

According to the present invention, any one or more materials are selected from a group consisting of the carbon soot molecules, the metal porphyrin complexes and the metal phthalocyanin complexes that have been excited by applied light, by electrons injected by the electrode or by the reducing reactions so that the method and the apparatus for preparing active oxygen, which have not been practised because the control of the reactions has been difficult, can be provided.

Use of the obtained active oxygen or use of one or more materials selected from the group consisting of the excited carbon soot molecules, the metal porphyrin complexes and the metal phthalocyanin complexes that exhibit excellent reactivity enables the apparatus for decomposing the harmful substances in the harmful gas or the fluid exhibiting advantages in saving energy and reduced size can be provided.

What is claimed is:

1. A reaction control method comprising:
   (a) reacting carbon soot molecules which are in an excited state with oxygen molecules so as to form an active oxygen species and;
   (b) reacting the active oxygen species with a decomposable substance present in a gas or a liquid so as to decompose the decomposable substance,
wherein the decomposable substance is NO, which is decomposed to $N_2O$ and $N_2$.

2. A reaction control method according to claim 1 wherein the decomposable substance is in the form of a gas.

3. A reaction control method according to claim 1 wherein the decomposable substance is in the form of a fluid.

4. A reaction control method according to claim 1 wherein the decomposable substance is present in a gas containing the oxygen.

5. A reaction control method according to claim 1 wherein said excited state is realized by applying light having a wavelength of 200 nm to 600 nm to the carbon soot molecules.

6. A reaction control method according to claim 1 wherein said excited state is realized by injecting the carbon soot molecules with electrons.

7. A reaction control method according to claim 1 wherein said carbon soot molecules are selected from the group consisting of fullerene molecules in the form of a spherical shell, carbon molecules Cn (n=18 to 300) in the form of a spherical-shell fragment, and mixtures thereof.

8. A reaction control method according to claim 1 wherein carbon soot molecules are in a powder state, a state in which powder is held by a carrier, a thin film state or a solidified-film state formed from a powder.

9. A reaction control method according to claim 1 wherein the reactions of (a) and (b) are performed under continuous or intermittent heating.

10. A reaction control method comprising direct contact reacting at least one compound in an excited state, said at least one compound being selected from the group consisting of metal porphyrin complexes and metal phthalocyanine complexes, with a decomposable substance that is present in a liquid or a gas, which comprises the transfer of electrons from the compound in the excited state to the decomposable substance so as to decompose the decomposable substance into other substances, wherein the decomposable substance is NO, which is decomposed to $N_2O$ and $N_2$.

11. The reaction control method according to claim 10 where the decomposable substance in the form of a gas.

12. The reaction control method according to claim 10 where the decomposable substance is in the form of a fluid.

13. The reaction control method according to claim 10 wherein the excited state is realized by applying light having a wavelength of 200 nm to 600 nm to the at least one compound.

14. The reaction control method according to claim 10 wherein the excited state is realized by injecting the at least one compound with electrons.

15. The reaction control method according to claim 10 wherein the at least one compound is in a powder state, a state in which powder is held by a carrier, a thin film state, or a solidified-film state formed from a powder.

16. The reaction control method according to claim 10 wherein the reaction is performed under continuous or intermittent heating.

17. A reaction control method comprising direct contact reacting carbon soot molecules which are in an excited state with a decomposable substance that is present in a liquid or a gas, so as to decompose the decomposable substance, wherein the decomposable substance is NO, which is decomposed to $N_2O$ and $N_2$.

18. The reaction control method according to claim 17 wherein the decomposable substance in the form of a gas.

19. The reaction control method according to claim 17 wherein the decomposable substance is in the form of a fluid.

20. The reaction control method according to claim 17 wherein the excited state is realized by applying light having a wavelength of 200 nm to 600 nm to the carbon soot molecules.

21. The reaction control method according to claim 17 wherein the excited state is realized by injecting the carbon soot molecules with electrons.

22. The reaction control method according to claim 17 wherein the carbon soot molecules are selected from the group consisting of fullerene molecules in the form of a spherical shell, carbon molecules Cn, where n is 18 to 300, in the form of a spherical-shell fragment, and mixtures thereof.

23. The reaction control method according to claim 17 wherein the carbon soot molecules are in a powder state, a state in which powder is held by a carrier, a thin film state, or a solidified-film state formed from a powder.

24. The reaction control method according to claim 17 wherein the reaction is performed under continuous or intermittent heating.

* * * * *